(12) United States Patent
Spindler

(10) Patent No.: US 10,968,906 B2
(45) Date of Patent: *Apr. 6, 2021

(54) COMPRESSOR FOR DISCHARGING A MEDIUM

(71) Applicant: Illinois Tool Works Inc., Glenview, IL (US)

(72) Inventor: Martin Patrick Spindler, Herdwangen (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/549,559

(22) PCT Filed: Feb. 23, 2016

(86) PCT No.: PCT/US2016/019110
§ 371 (c)(1),
(2) Date: Aug. 8, 2017

(87) PCT Pub. No.: WO2016/137981
PCT Pub. Date: Sep. 1, 2016

(65) Prior Publication Data
US 2018/0023554 A1  Jan. 25, 2018

(30) Foreign Application Priority Data

Feb. 24, 2015  (DE) .......................... 102015102625.2
Feb. 16, 2016  (DE) .......................... 102016102654.9

(51) Int. Cl.
*F04B 35/01*  (2006.01)
*B29C 73/16*  (2006.01)
(Continued)

(52) U.S. Cl.
CPC ............ *F04B 35/01* (2013.01); *B29C 73/166* (2013.01); *F04B 9/047* (2013.01); *F04B 27/005* (2013.01);
(Continued)

(58) Field of Classification Search
CPC ....... F04B 35/01; F16H 19/043; B29C 73/166
(Continued)

(56) References Cited

U.S. PATENT DOCUMENTS 1,316,437 A * 9/1919 Flood .................... F16H 19/043
                                                    123/55.7
1,362,901 A * 12/1920 Simonton ............. F16H 19/043
                                                    74/32
(Continued)

FOREIGN PATENT DOCUMENTS

DE  102004042911 A1  3/2006
EP       2353848 A1  8/2011
(Continued)

OTHER PUBLICATIONS

International Search Report dated Apr. 19, 2016 for International Application No. PCT/US2016/019110 filed Feb. 23, 2016.

*Primary Examiner* — Michael Leslie
(74) *Attorney, Agent, or Firm* — Blue Filament Law PLLC

(57) ABSTRACT

In a compressor for discharging a medium, in particular tire sealant that is to be discharged from a container into a tire, wherein a motor (1) of the compressor (P) drives a step-up transmission wheel (3, 3.1) for moving at least one piston (6-6.6) in a compression chamber (7), the step-up transmission wheel (3, 3.1) is intended to be provided only partially on its circumference with a toothing (20) and/or to consist of two toothed wheels (11, 12) lying on each other.

4 Claims, 6 Drawing Sheets

(51) Int. Cl.
   *F04B 27/00* (2006.01)
   *F04C 18/22* (2006.01)
   *F16H 21/18* (2006.01)
   *F04B 9/04* (2006.01)
   *F04B 35/04* (2006.01)
   *F04B 39/00* (2006.01)
   *F16H 19/04* (2006.01)
   *F04B 39/12* (2006.01)
   *F04B 23/02* (2006.01)

(52) U.S. Cl.
   CPC .......... *F04B 35/04* (2013.01); *F04B 39/0022* (2013.01); *F04C 18/22* (2013.01); *F16H 19/043* (2013.01); *F16H 21/18* (2013.01); *F04B 23/02* (2013.01); *F04B 39/12* (2013.01)

(58) Field of Classification Search
   USPC ................................................ 92/136; 74/50
   See application file for complete search history.

(56) References Cited

U.S. PATENT DOCUMENTS

| | | | | |
|---|---|---|---|---|
| 1,601,188 A * | 9/1926 | Nagel | ................... | F16H 19/043 74/32 |
| 1,897,190 A * | 2/1933 | Eyston | ................. | F04B 1/1136 417/462 |
| 3,232,523 A * | 2/1966 | Luck | ....................... | F02B 53/00 418/100 |
| 3,671,153 A * | 6/1972 | Luck | ....................... | F04C 18/10 418/188 |
| 4,395,977 A * | 8/1983 | Pahis | ...................... | F01B 9/047 123/197.4 |
| 5,215,447 A | 6/1993 | Wen | | |
| 5,259,256 A | 11/1993 | Brackett | | |
| 5,267,002 A * | 11/1993 | Maitani | ................ | F16H 19/043 399/213 |
| 5,390,585 A * | 2/1995 | Ryuh | .................... | F16H 25/122 417/534 |
| 5,528,946 A * | 6/1996 | Yadegar | ................ | F16H 19/043 123/197.1 |
| 5,782,213 A * | 7/1998 | Pedersen | ................. | F01B 9/026 123/197.4 |
| 6,439,104 B1 | 8/2002 | Tonogai et al. | | |
| 6,789,439 B2 * | 9/2004 | Tung | ..................... | F16H 19/043 74/112 |
| 8,522,833 B2 * | 9/2013 | Chou | ..................... | F04B 35/04 141/38 |
| 8,562,306 B2 * | 10/2013 | Kojima | ................... | F04B 35/06 417/63 |
| 8,746,293 B2 * | 6/2014 | Chou | ........................ | B60S 5/04 141/38 |
| 9,302,654 B2 * | 4/2016 | Spindler | .................... | B60S 5/04 |
| 9,593,579 B2 * | 3/2017 | Li | ........................... | F01B 9/026 |
| 9,956,730 B2 * | 5/2018 | Kono | .................. | F04B 11/0008 |
| 10,384,406 B2 * | 8/2019 | Spindler | ................. | F04B 39/123 |
| 2004/0129244 A1 * | 7/2004 | Beaudoin | ................ | F01C 1/077 123/242 |
| 2004/0261750 A1 * | 12/2004 | McKeown | .............. | F01B 9/047 123/197.1 |
| 2006/0207358 A1 * | 9/2006 | Tung | ..................... | F16H 19/043 74/30 |
| 2007/0264139 A1 * | 11/2007 | Chou | ........................ | F04B 9/045 417/415 |
| 2009/0056850 A1 * | 3/2009 | Yanagi | .................... | F04B 41/02 152/504 |
| 2015/0059921 A1 * | 3/2015 | Jhou | ...................... | F04B 35/06 141/38 |
| 2017/0015072 A1 * | 1/2017 | Kawatani | .............. | B29C 73/025 |
| 2017/0350476 A1 * | 12/2017 | Spindler | ............... | B29C 73/166 |
| 2018/0272631 A1 * | 9/2018 | Zaum | ..................... | B60S 5/046 |
| 2018/0306107 A1 * | 10/2018 | Pogam | .................. | F02B 75/048 |

FOREIGN PATENT DOCUMENTS

| | | |
|---|---|---|
| GB | 1285899 A | 8/1972 |
| WO | 2010066448 A1 | 6/2010 |

* cited by examiner

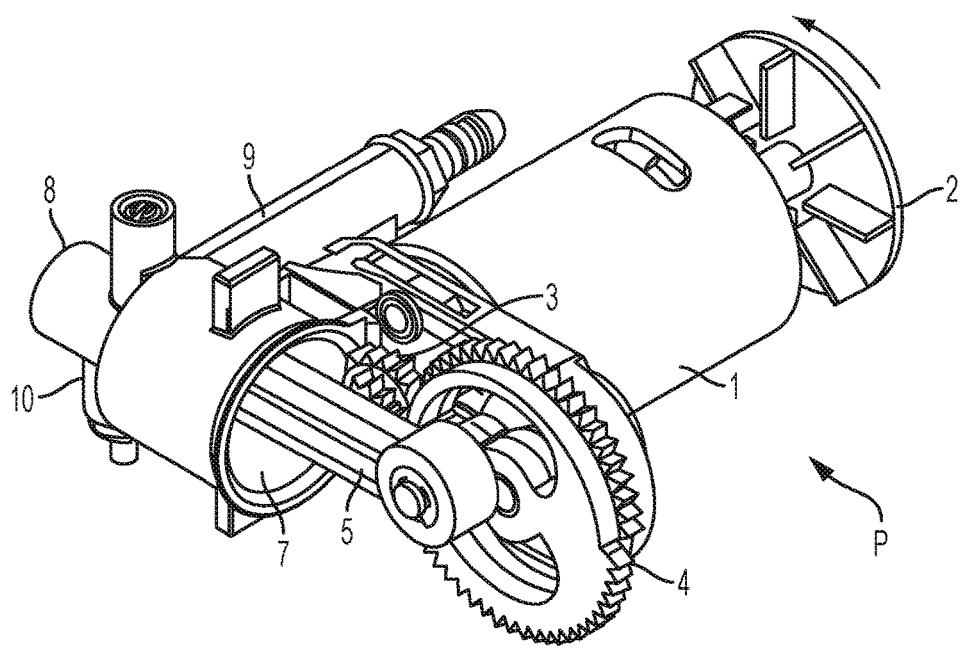
FIG. 1
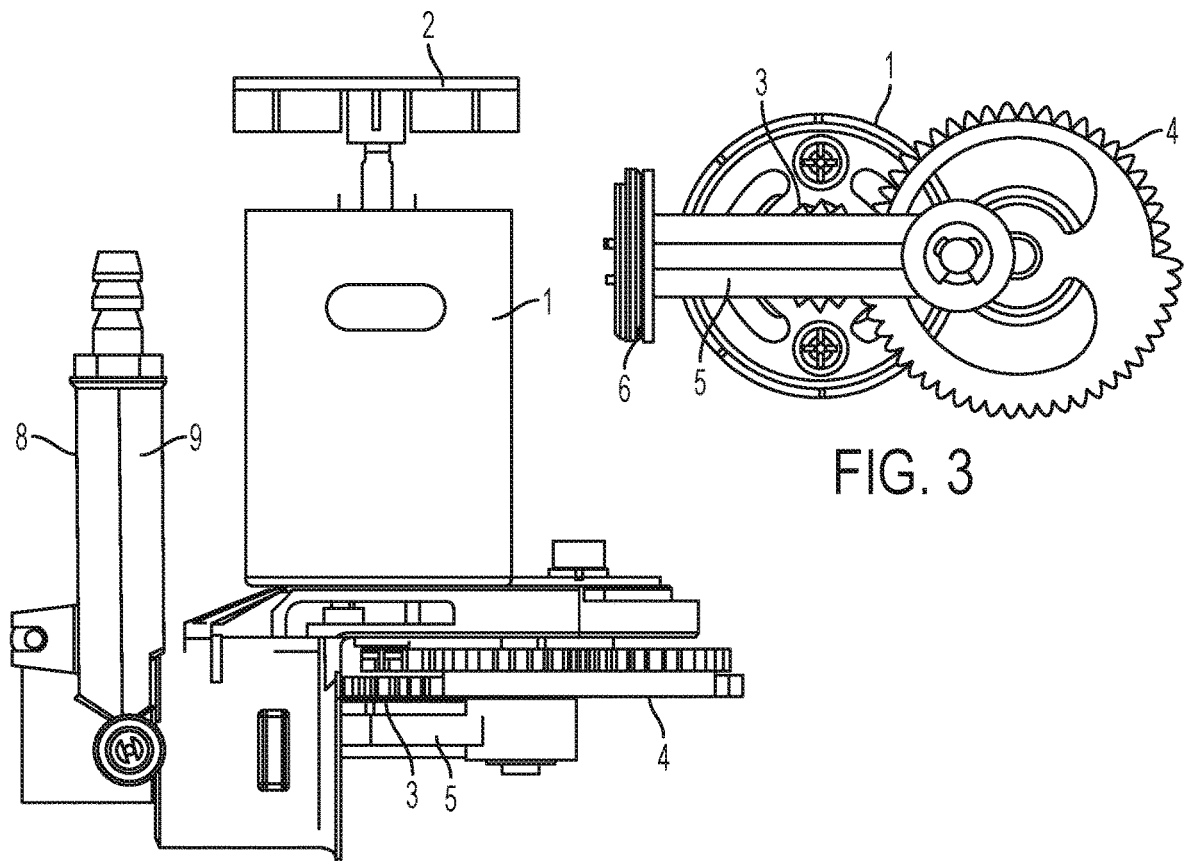
FIG. 3
FIG. 2

COMPRESSOR FOR DISCHARGING A MEDIUM

The invention relates to a compressor for discharging a medium, in particular tire sealant that is to be discharged from a container into a tire, wherein a motor of the compressor drives a step-up transmission wheel for moving at least one piston in a compression chamber.

PRIOR ART

DE 10 2004 042 911 A1 discloses a device for conveying a gas from a pressure chamber, in particular for discharging a sealant from this container into a tire of a vehicle and for inflating the tire. A compressor can be attached to the sealant container disclosed in said document. This compressor can also be configured as a diaphragm compressor which compresses air present in the sealant container in order to force sealant out of the sealant container.

Moreover, WO 2010/066448 discloses a device for conveying a gas from a pressure chamber, in particular for discharging a sealant from this container into a tire of a vehicle and/or for inflating the tire, wherein a piston is arranged to be oscillatingly movable in the pressure chamber. A gear element is also assigned to the piston and converts a rotational movement of the input shaft of a drive into an oscillating movement.

Problem

The problem addressed by the present invention is that of simplifying and improving known compressors for conveying a gas from a pressure chamber and for transporting a medium.

Solution to the Problem

The problem is solved by the fact that the step-up transmission wheel is provided only partially on its circumference with a toothing and/or consists of two toothed wheels lying on each other.

In one illustrative embodiment of the present invention, the compressor has a motor which is connected eccentrically to a piston rod via an output wheel, which piston rod moves a piston in the compression chamber. According to the invention, provision is made that the step-up transmission wheel is arranged upstream from the output wheel. The step-up transmission wheel and output wheel are adapted to each other such that a different transmission of force can take place depending on which toothings are in engagement. For this purpose, provision is made that the output wheel consists of two wheel halves that lie on each other. Each wheel half has a toothing, but the latter does not extend over the entire circumference, and instead only over a predetermined number of degrees. In the preferred illustrative embodiment, this number of degrees is in each case 180°, although other ratios are also conceivable, for example 270° or 90°. It depends on the desired efficiency of the overall system.

By contrast, the step-up transmission wheel consists of two toothed wheels which lie on each other and which interact alternately with one or other wheel half of the output wheel. One toothed wheel has a greater diameter than the other toothed wheel. The toothed wheel with the greater diameter can apply a greater force to the output wheel than can the toothed wheel with the smaller diameter. Therefore, the toothed wheel with the greater diameter engages in the corresponding toothing of the output wheel when air is to be compressed into the compression chamber. By contrast, if air is only to be sucked in, the toothed wheel with the smaller diameter engages in the toothing of the output wheel half assigned to it.

In a further illustrative embodiment of the invention, the step-up transmission wheel is provided only partially on its circumference with a toothing. This toothing alternately engages in at least two toothings of a fork element on which at least one piston is provided. The function is such that, with the direction of rotation remaining constant, the step-up transmission wheel engages alternately in the different toothings and thus causes a different movement of the piston.

In a preferred illustrative embodiment, the piston is connected to a fork element which forms an elongate opening into which the step-up transmission wheel engages. Two opposite side flanks of this fork element enclose this elongate opening more or less elliptically, wherein the side flanks on the inside of the elongate opening are provided with the toothings lying opposite each other. By contrast, the step-up transmission wheel is provided with a toothing over only about half of its circumference. If this step-up transmission wheel now rotates about its axis, the arrangement is configured such that the toothing of the step-up transmission wheel initially runs along an inner toothing of the fork element and, at the end of this toothing, engages with at least one tooth in the opposite toothing. This brings about a movement of the fork element in the opposite direction, as a result of which the piston is moved to and fro in the compression chamber.

In a preferred illustrative embodiment, however, the fork element is connected to in each case one piston at both ends. It is also conceivable here that the fork element is also connected to several pistons via a corresponding joint and corresponding piston rods, which pistons move in corresponding compression chambers. This allows a corresponding compressor according to the invention to be arranged in a wheel rim, specifically in a five-hole wheel rim, since the corresponding pistons are then able to move between the holes. This of course also applies to a rim with three or four holes.

In these arrangements, a transmission of force and a distribution of the pressure forces to different compression chambers are greatly improved.

A further concept of the present invention, and one for which protection is also claimed independently, relates to the fact that the motor is assigned not just one compression chamber but several compression chambers, of which the volume is modifiable. In this way, a much greater volumetric flow toward the tire can be generated than is customary in the conventional compressors. The present invention conceives in particular of two illustrative embodiments, namely, on the one hand, a multi-piston principle, in which the piston shape does not necessarily have to be round, and, on the other hand, a rotary piston principle, which operates according to the Wankel principle.

In both cases, the motor used should be of the so-called plate motor design (motor diameter>motor length).

The multi-piston principle will in particular involve the use of two pistons which are connected to each other and are actuated jointly by the motor or the shaft of the motor. Of course, this does not exclude the possibility of also being able to use more than two pistons.

For example, if two pistons are moved in two compression chambers, these two pistons can be connected to each other. For example, this then involves the mutually opposite end faces of a sliding piston. An eccentrically mounted pin, coupled to the shaft of the motor, then engages in this sliding piston and, during the rotation of the shaft of the motor, runs in an oblong hole in the sliding piston and thus effects a linear movement of the sliding piston. Both compression chambers are connected to the intake line to the sealant container or directly to the tire.

In the rotary piston principle (Wankel principle), a non-round piston is mounted on the motor output shaft. This non-round piston rotates in a compartment and divides this compartment into several compression chambers, wherein the compartment is also assigned suction openings and ejection openings for air, depending on the number of the compression chambers. Edges of the non-round piston run along an inner wall of the compartment and are supported relative to the latter by double seals.

DESCRIPTION OF THE FIGURES

Further advantages, features and details of the invention will become clear from the following description of preferred illustrative embodiments and from the drawing, in which FIG. 1 shows a perspective view of a compressor according to the invention;

FIG. 2 shows a plan view of the compressor according to FIG. 1;

FIG. 3 shows a partial view of the compressor according to FIG. 2 seen in direction X;

Figure 4:
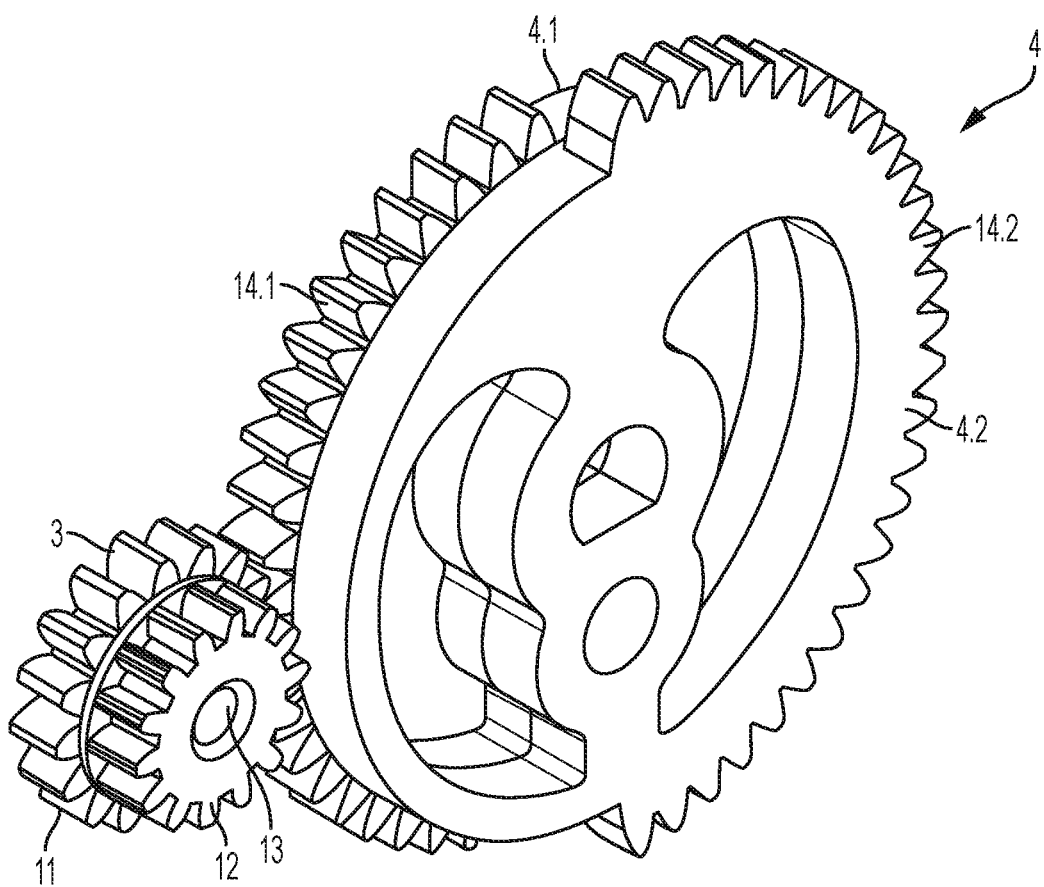
FIG. 4 shows a perspective view of the interaction between a step-up transmission wheel and an output wheel.

According to FIG. 1, a compressor P according to the invention has a motor 1, which is cooled by a fan 2. A step-up transmission wheel 3, which sits on a motor shaft (not shown), interacts with an output wheel 4.

The output wheel 4 is connected eccentrically to a piston rod 5, which moves a piston 6 (FIG. 3) in a compression chamber 7. A valve piece 8, which has a line 9 to a tire, for example, and has a connection 10 to a container for tire sealant, for example, is attached to this compression chamber 7.

This compressor functions as follows:

The step-up transmission wheel 3 is moved in rotation via the motor 1 and transmits its rotational movement to the output wheel 4. The latter in turn moves the piston rod 5 in the compression chamber 7. In this way, air is forced out of the compression chamber 7 into the valve piece 8 and into the line 9. A medium, in particular tire sealant, is then either sucked in from a container (not shown) via the connection 10 or is additionally forced into the line 9 and thus introduced, for example, into a tire that is to be sealed.

The present invention relates in part to an improvement of the force transmission of the force of the motor 1 to the piston rod 5 or the piston 6. It is known that more force is needed when compressing the air in the compression chamber 7 than when sucking new air into the compression chamber. To take account of this force relationship, both the step-up transmission wheel 3 and also the output wheel 4 are preferably formed in two parts. According to FIG. 4, the step-up transmission wheel 3 consists of two toothed wheels 11 and 12 which lie on each other and which have a congruent opening 13 for receiving a motor shaft. Moreover, the toothed wheel 11 also has a greater diameter than the toothed wheel 12.

The output wheel 4 consists of two halves 4.1 and 4.2. Each half is provided with a toothing 14.1 and 14.2, respectively. Each toothing 14.1 and 14.2 extends over only a half circumference of the respective output wheel half 4.1, 4.2, while the other half is free of toothing. Here too, provision is made that the output wheel half 4.2 with the toothing 14.2 has a greater diameter than the output wheel half 4.1 with the toothing 14.1. The toothed wheel 12 with the smaller diameter interacts with the output wheel half 4.2 with the greater diameter, while the toothed wheel 11 with the greater diameter interacts with the output wheel half 4.1 with the smaller diameter. As soon as the toothed wheel 11 with the greater diameter comes into engagement with the toothing 14.1 of the output wheel half 4.1, a greater force can thus be applied by the step-up transmission ratio, such that this state of engagement is preferred when a greater force is intended to act on the piston 6 during the compression. When the piston 6 retreats in order for new air to be sucked into the compression chamber 7, the toothed wheel 12 with the smaller diameter is then in engagement with the toothing 14.2 of the output wheel 4.2 with the smaller diameter.

FIGS. 5 to 8 show a further illustrative embodiment of a possible actuation of two pistons 6.1 and 6.2 in two compression chambers (not shown). The two pistons 6.1 and 6.2 are connected to each other via a fork element 15. For this purpose, the fork element 15 has two curved side flanks 16.1 and 16.2 which connect two connector stubs 17.1 and 17.2 on the pistons 6.1 and 6.2 to each other. The side flanks 16.1 and 16.2 enclose an elongate opening 18, and, within the interior of this elongate opening 18, parts of the side flanks 16.1 and 16.2 extending approximately parallel to each other are provided with a toothing 19.1 and 19.2, respectively.

A step-up transmission wheel 3.1, approximately half of which is provided with a further toothing 20, engages in this elongate opening 18.

This illustrative embodiment of a gear according to the invention, in particular for compressors, functions as follows:

The step-up transmission wheel 3.1, which sits on a shaft of a drive, rotates about its axis A. In doing so, the toothing 20 of the step-up transmission wheel 3.1 runs along the inner toothing 19.1 of the side flank 16.1, such that the fork element 15 moves downward according to the arrow 21 when the step-up transmission wheel 3.1 is fixed in position. During this, the piston 6.2 moves deeper into its compression chamber and forces the fluid or gas contained therein out of this compression chamber. At the same time, the piston 6.2 moves out from its associated compression chamber and sucks in fluid or gas.

Figure 6:
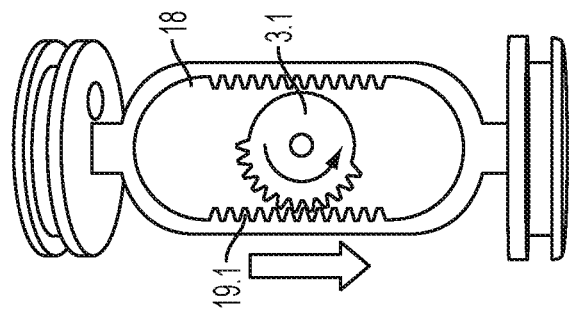

FIG. 6 shows the step-up transmission wheel 3.1 running along the toothing 19.1, the step-up transmission wheel 3.1 here being located approximately at the middle of the elongate opening 18.

Figure 8:
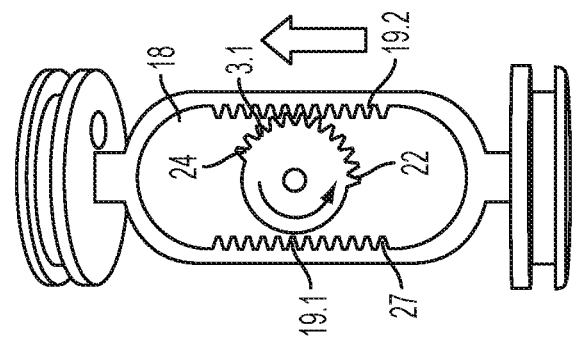
FIGS. 5-8 show schematic plan views of a further illustrative embodiment of part of a compressor according to the invention in different positions of use.
Figure 7:
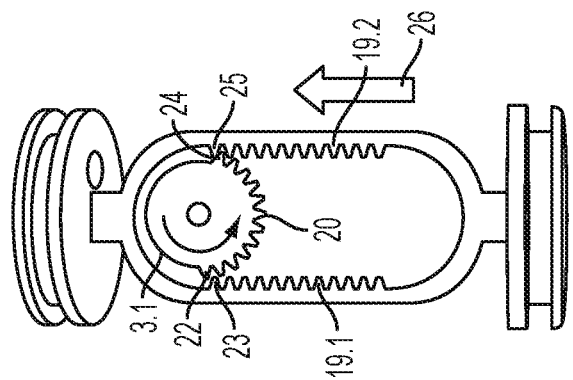

According to FIG. 7, an uppermost tooth 22 of the toothing 20 of the step-up transmission wheel 3.1 has now reached an uppermost tooth 23 of the toothing 19.1. At the same time, an opposite tooth 24 engages under an uppermost tooth 25 of the opposite toothing 19.2. Upon further rotation of the step-up transmission wheel 3.1, the toothing 20 engaging in the toothing 19.2 carries the fork element 15.1 in the opposite direction, as is shown by the arrow 26. FIG. 8 shows the corresponding central position of the step-up transmission wheel 3.1 in the elongate opening 18.

Figure 5:
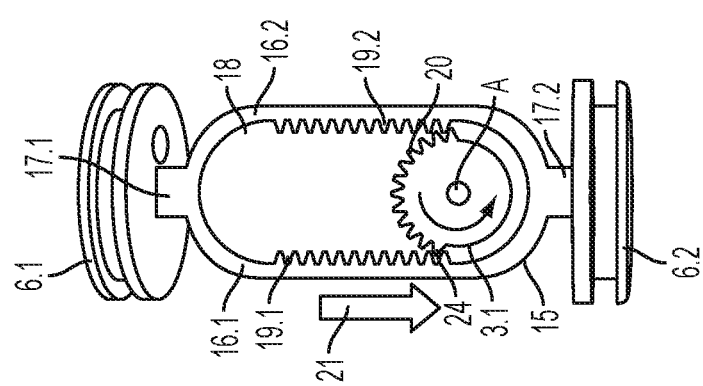

Finally, the tooth 24 of the toothing 20 of the step-up transmission wheel 3.1 reaches a lower tooth 27 of the toothing 19.1 and the position of use shown in FIG. 5, wherein the opposite tooth 22 again unlatches from the toothing 19.2.

The tooth 24 now comes into engagement with the toothing 19.1, as is shown in FIG. 5.

Figure 9:
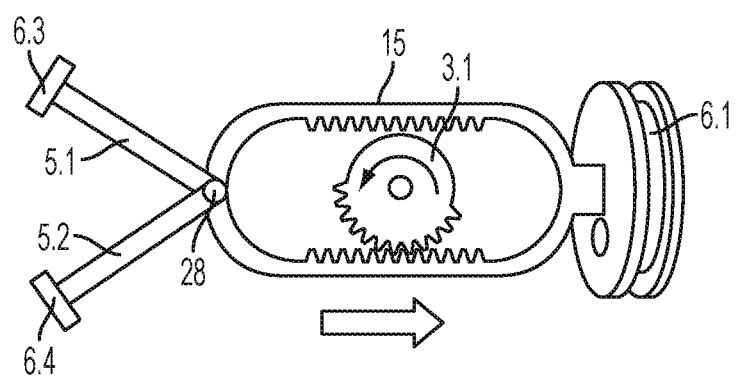
FIGS. 9 and 10 show schematic plan views of two further illustrative embodiments of parts of a compressor according to the invention.

FIG. 9 shows that the fork element 15 according to the invention can also interact with three pistons. For this purpose, instead of the piston 6.2, two piston rods 5.1 and 5.2 are connected to the fork element 15 via a joint 28. A piston 6.3, 6.4 is provided at the other end of the piston rods 5.1, 5.2, respectively.

Figure 10:
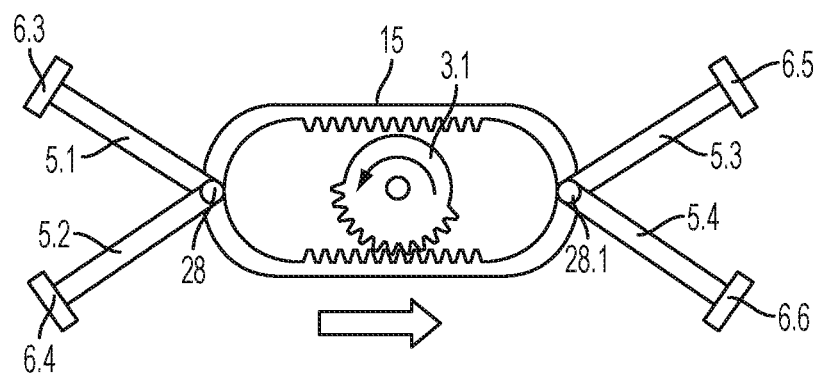

In FIG. 10, the fork element 15 actuates two mutually opposite pairs of pistons 6.3, 6.4 and 6.5, 6.6, wherein the pair 6.5, 6.6 replaces the piston 6.1 and is connected to the fork element 15 via corresponding piston rods 5.3 and 5.4, respectively, and via a joint 28.1.

However, the process of movement of the arrangement according to FIG. 9 and FIG. 10 corresponds to the details concerning the function of the illustrative embodiment according to FIGS. 5 to 8.

Figure 11:
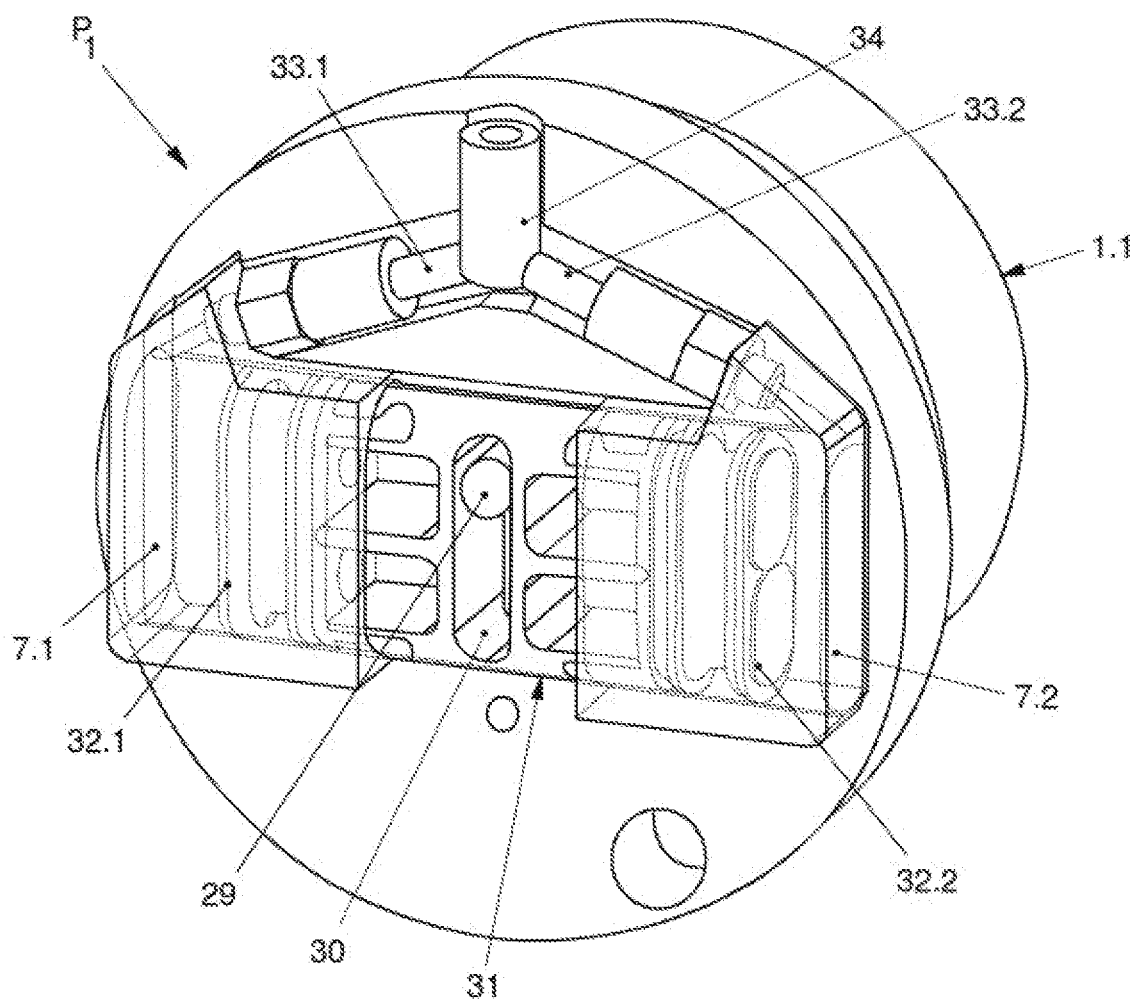
FIG. 11 shows a perspective view of a further illustrative embodiment of a compressor according to the invention.

A further illustrative embodiment of a compressor P1 according to the invention is shown in FIG. 11, in which it will be seen that a motor 1.1 is used which is configured according to the so-called plate motor design. A characteristic of this design is that the motor diameter is greater than the motor length. This means it takes up very little space. Particular preference is given to electronically actuated, brushless motors with a much improved efficiency compared to conventional brush motors, also external rotor motors.

An output shaft (not shown in detail) of this motor 1.1 engages with an eccentrically mounted pin 29 in an oblong hole 30 of a sliding piston 31. Since the pin itself also rotates, a rolling movement takes place in the oblong hole 30.

Both ends of the sliding piston 31 are designed as pressure pistons 32.1 and 32.2; it will be seen that they are not round. However, they each run in separate compression chambers 7.1 and 7.2 and each force air out of these compression chambers 7.1 and 7.2 into branch lines 33.1 and 33.2, which are jointly connected to an intake line 34 to the sealant container or tire. In addition to the pressure pistons 32.1 and 32.2, lubricant depots 41.1 and 41.2 are also provided.

By virtue of this arrangement, twice the amount of compressed air can be delivered to the intake line 34. Of course, the components 33.1, 33.2 and 34 do not have to be configured as separate components as shown, and instead they can be integrated in the housing.

Figure 12:
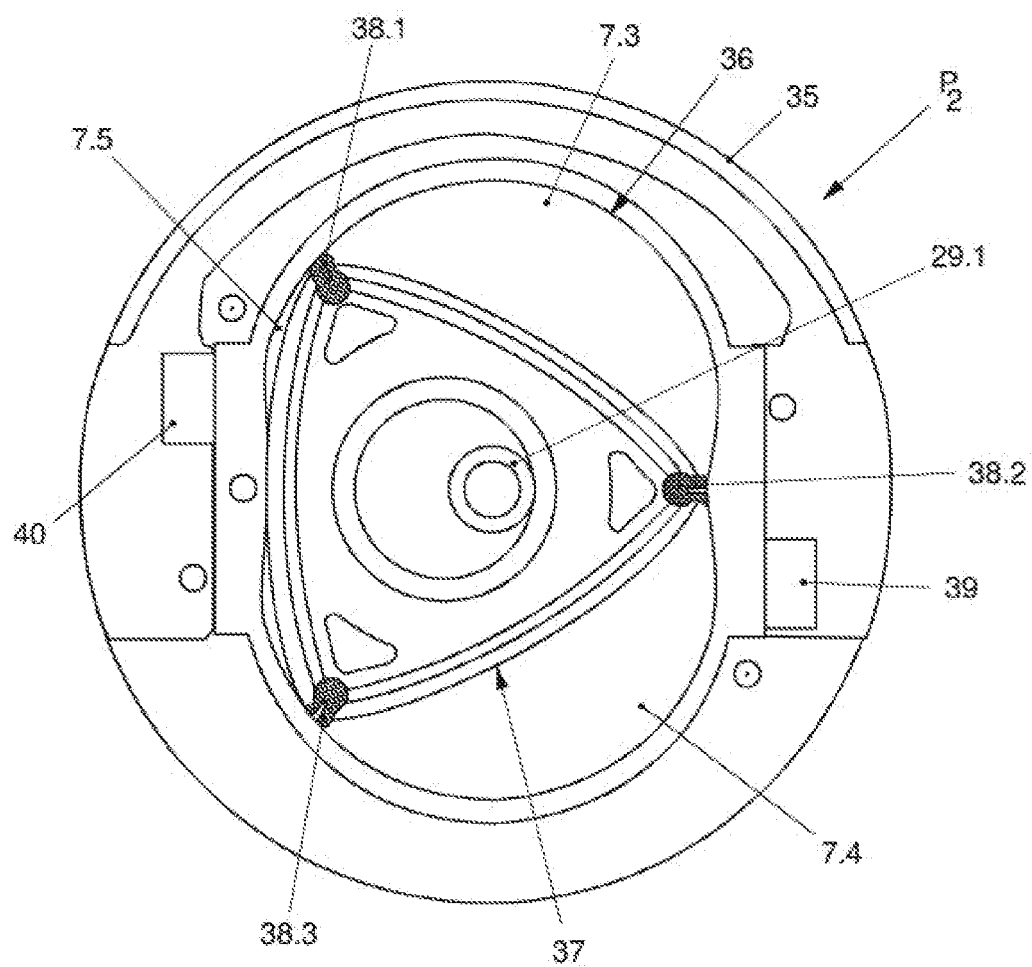
FIG. 12 shows a plan view of a further illustrative embodiment of a compressor according to the invention.

In a further illustrative embodiment of the invention according to FIG. 12, the so-called Wankel principle is used for a compressor P2. Here, a compartment 36, in which a non-round piston 37 rotates, is formed in a housing part 35. In the illustrative embodiment shown, this non-round piston 37 has a triangular shape, although other geometries are also conceivable. It is essential only that the non-round piston 37 forms different compression chambers 7.3 and 7.4 in the compartment 36, and the volume of said compression chambers can be modified during the rotation of the non-round piston 37 about the output shaft of the motor or an eccentrically mounted rotor 44. This rotor 44 has no internal toothing with step-up transmission. Instead, only one bearing is present.

The individual compression chambers are separated from each other by double seals 38.1 to 38.3. The double seals 38.1 to 38.3 are each assigned lubricant depots 42.1 to 42.3, which lubricate lips 43.1 to 43.3.

For example, if the non-round piston 37 rotates clockwise, the double seal 38.2 travels across an ejection opening 35.1, such that air can now be ejected from the compression chamber 7.4 through an opposite ejection opening 39.2. However, at the same time, air is sucked into the compartment 7.3 through a corresponding inlet. The inlets do not necessarily need valves, since the piston 37 takes over the control. The piston movement "replaces" a separate valve.

| List of reference signs | |
|---|---|
| 1 | motor |
| 2 | fan |
| 3 | step-up transmission wheel |
| 4 | output wheel |
| 5 | piston rod |
| 6 | piston |
| 7 | compression chamber |
| 8 | valve piece |
| 9 | line |
| 10 | connection |
| 11 | toothed wheel |
| 12 | toothed wheel |
| 13 | opening |
| 14 | toothing |
| 15 | fork element |
| 16 | side flank |
| 17 | connector stub |
| 18 | elongate opening |
| 19 | toothing |
| 20 | toothing of 3.1 |
| 21 | arrow |
| 22 | uppermost tooth of 20 |
| 23 | uppermost tooth of 19.1 |
| 24 | tooth of 20 |
| 25 | uppermost tooth of 19.2 |
| 26 | arrow |
| 27 | lower tooth of 19.1 |
| 28 | joint |
| 29 | pin |
| 30 | oblong hole |
| 31 | sliding piston |
| 32 | pressure piston |
| 33 | branch lines |
| 34 | intake line |
| 35 | housing part |
| 36 | compartment |
| 37 | non-round piston |
| 38 | double seal |
| 39 | ejection opening |
| 40 | suction opening |
| 41 | lubricant depot |
| 42 | lubricant depot |
| 43 | lips |
| 44 | rotor |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |

-continued

List of reference signs

| | |
|---|---|
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| A | axis of 3.1 |
| P | compressor |

The invention claimed is:

1. A compressor for discharging a tire sealant from a container into a tire, said compressor comprising a motor (1) that drives a step-up transmission wheel (3) which in turn drives an output wheel (4) for moving at least one piston (6-6.6) between a compression stroke and an intake stroke in a compression chamber (7), sucking in air during the intake stroke and forcing air and tire sealant from the container during the compression stroke, the step-up transmission wheel (3) being two entirely toothed wheels (11, 12) lying on each other, a first (12) of the two entirely toothed wheels having a smaller diameter than a second (11) of the two entirely toothed wheels, and the output wheel (4) being two partially toothed wheels (4.1, 4.2) lying on each other, a first (4.2) of the partially toothed wheels having a larger diameter than a second (4.1) of the partially toothed wheels, wherein the first entirely toothed wheel (12) is configured to interact with the teeth of the first partially toothed wheel (4.2) during the intake stroke and the second entirely toothed wheel (11) is configured to interact with the teeth of the second partially toothed wheel (4.1) during the compression stroke.

2. The compressor as claimed in claim 1, wherein the step-up transmission wheel (3) is connected eccentrically to the output wheel (4) and, by way of the latter, to a piston rod (5), which moves a piston (6) in a compression chamber (7).

3. The compressor as claimed in claim 2, wherein the toothing (14.1) of the second (4.1) of the partially toothed wheels extends about one arc distance and the toothing (14.2) of the first (4.2) of the partially toothed wheels extends about another arc distance.

4. The compressor as claimed in claim 3, wherein the number of degrees is in each case 180°.

* * * * *